United States Patent
Hayasaka

[19]

[11] Patent Number: 6,115,798
[45] Date of Patent: Sep. 5, 2000

[54] STORAGE DEVICE WITH BACKUP FUNCTION AND INFORMATION PROCESSING SYSTEM HAVING THE SAME

[75] Inventor: Kazumi Hayasaka, Kawasaki, Japan

[73] Assignee: Fujitsu Limited, Kawasaki, Japan

[21] Appl. No.: 08/976,955

[22] Filed: Nov. 24, 1997

Related U.S. Application Data

[63] Continuation of application No. 08/612,676, Mar. 8, 1996, abandoned.

[30] Foreign Application Priority Data

Aug. 4, 1995 [JP] Japan .................................. 7-199837

[51] Int. Cl.[7] .................................................. G06F 12/16
[52] U.S. Cl. ........................ 711/162; 711/161; 711/147; 707/204; 714/36; 714/22; 714/6; 714/15
[58] Field of Search .................................. 711/162, 161, 711/147; 707/204; 714/36, 22, 6, 15

[56] References Cited

U.S. PATENT DOCUMENTS

| | | | |
|---|---|---|---|
| 4,564,922 | 1/1986 | Muller | 395/489 |
| 4,799,186 | 1/1989 | Ployette | 711/162 |
| 4,974,156 | 11/1990 | Harding et al. | 711/162 |
| 4,996,687 | 2/1991 | Hess et al. | 711/162 |
| 5,404,483 | 4/1995 | Stamm et al. | 395/470 |
| 5,535,399 | 7/1996 | Blitz et al. | 395/750 |
| 5,692,155 | 11/1997 | Iskiyan et al. | 711/162 |
| 5,771,367 | 7/1998 | Beardsley et al. | 711/162 |

FOREIGN PATENT DOCUMENTS

| | | |
|---|---|---|
| 59-55557 | 3/1984 | Japan . |
| 2-18612 | 1/1990 | Japan . |
| 3-135646 | 6/1991 | Japan . |
| 4-160633 | 6/1992 | Japan . |

*Primary Examiner*—Hiep T. Nguyen
*Attorney, Agent, or Firm*—Armstrong, Westerman, Hattori, McLeland & Naughton

[57] ABSTRACT

A storage device that can reduce the backup operation time by shortening the backup path. The storage device having a memory unit and a memory control unit that controls access to the memory unit includes a backup storage medium; and a backup control unit for implementing an access control under which data in the memory unit is read out via the memory control unit when data in the memory unit is backed up and the readout data is written as backup data into the backup storage medium. The storage device is suitable for use in information processing systems such as parallel computing systems.

6 Claims, 5 Drawing Sheets

STORAGE DEVICE WITH BACKUP FUNCTION AND INFORMATION PROCESSING SYSTEM HAVING THE SAME

This application is a continuation of application Ser. No. 08/612,676 filed Mar. 8, 1996, now abandoned.

BACKGROUND OF THE INVENTION

1) Field of the Invention

The present invention relates to a storage device that has the function of backing up data at a power failure. The present invention also relates to an information processing system such as a parallel computing system in which one or more processing units share the storage device.

2) Description of the Related Art

FIG. 3 is a block diagram illustrating the configuration of a parallel computing system acting as a general information processing system. Referring to FIG. 3, the parallel computing system includes plural processing units (processor elements) 1 and a single shared storage device shared by the processing units 1. The processing units 1 are connected to the single shared storage device 2 via a shared bus 3. The shared storage unit 2 has the configuration shown in FIG. 4 (to be described later) and receives a write request and a read request from each processing unit via the shared bus 3.

A storage medium 6 such as a magnetic tape unit is connected to the shared bus 3 via the adaptor 4. A storage medium 7 such as a magnetic disk unit is connected to the shared bus 3 via the adapter 5. Each processing unit 1 can access to the storage medium 6 via the shared bus 3 and the adaptor 4. The shared storage unit 2 can access to the storage medium 7 via the shared bus 3 and the adaptor 5. The adaptor 4 controls access to the storage medium 6, according to a write request or read request received via the shared bus 3. The adaptor 5 controls access to the storage medium 7, according to a write request or read request received via the shared bus 3.

Data storage area for data backup of the shared storage device 2 as well as data storage area for OS and application software, for example, are allocated to the storage medium 6. Data storage area for user's data, for example, is allocated to the storage medium 7. The media 6 and 7 are mounted in a cabinet housing the parallel computing system or mounted in a different cabinet from the former and of course are arranged separately from the shared storage device 2.

A power unit 8 is connected to each processing unit 1, the shared storage device 2, the adaptors 4 and 5, and storage media 6 and 7 via the power supply line 9 to supply power energy. An auxiliary power unit 10 is arranged additionally to the power unit 8. The auxiliary power unit 10 supplies auxiliary power energy for backup operation to the shared storage device 2, the adaptor 4, and the storage medium 6 via the power supply line 9. Referring to FIG. 3, the area where the auxiliary power unit 10 supplies backup auxiliary power energy is shown as a region surrounded with alternate long and short line.

As shown in FIGS. 4 and 5, the shared storage device 2 shown in FIG. 3 is formed of a shared memory unit 2a, a shared bus control unit 2b connected to the shared bus 3 for controlling transmission and reception via the shared bus 3, and a memory control unit 2c that controls access to the memory unit 2a based on a write request or read request to each processing unit 1 received via the shared bus 3 and the shared bus control unit 2b.

As shown in FIG. 5, the adaptor 4 shown in FIG. 3 consists of a shared bus control unit 4a connected to the shared bus 3 for controlling transmission and reception via the shared bus 3; and a storage medium control unit 4b that controls access to the storage medium 6 based on a write request or read request to each processing unit 1 or the shared storage device 2 received via the shared bus 3 and the shared bus control unit 4a. The adaptor 5 is formed similarly to the adaptor 4.

The data backup operation and restoring operation in the computing system will be explained below by referring to FIG. 5.

At a power failure, the auxiliary power unit 10 supplies auxiliary power energy. At the same time, as shown with the thick solid arrows in FIG. 5 (corresponding to a backup path), the memory control unit 2c in the shared storage device 2 reads out data stored in the shared memory unit 2a to send it to the shared bus control unit 2b. The shared bus control unit 2b sends data to the adaptor 4 to control access to the backup storage medium 6 via the shared bus 3. In the adaptor 4, when the shared bus control unit 4a receives data to be backed up, the storage medium control unit 4b receives the data and then writes it into the storage medium 6. This step enables the data backup operation of the shared storage device 2.

On the other hand, after a power failure restoring, as shown with the dotted arrows (corresponding to a restoring path) in FIG. 5, the storage medium control unit 4b in the adaptor 4 reads data out of the backup storage medium 6 and then sends it to the shared bus control unit 4a. The shared bus control unit 4a sends the data to the shared storage device 2 via the shared bus 3. In the shared storage device 2, when receiving data to be restored, the shared bus control unit 2b sends it to the memory control unit 2c. Then, the memory control unit 2c writes the data into the shared memory area 2a. This step enables the data restoring operation to the shared storage device 2.

There are the following problems in the prior art described above.

(1) The storage medium 6 that backs up data of the shared storage unit 2 is arranged separately from shared storage device 2. At the backup operation at a power failure, the backup auxiliary power unit 10 must supply continuously power energy till the power to the entire backup path (within the area surrounded with alternate long and short line in FIG. 3) has been completely backed up. Hence the capacity of the auxiliary power unit 10 must be made extremely large.

(2) Since data backup operation is made by way of the shared bus 3 and the adaptor 4, as described before with FIG. 5, the data transfer path becomes long, thus prolonging the backup time. This long data transfer path causes the larger capacity of the backup auxiliary power unit 10.

(3) The increased capacity of the auxiliary power unit 10 described above leads to its physically enlarged dimension. In the end, the cabinet for the computing system becomes larger.

(4) The increased capacity of the auxiliary power unit 10 takes much time until it is recharged after the auxiliary power unit 10 has been once discharged for a backup operation at a power failure. For that reason, if power failure should occur repeatedly at short intervals, the auxiliary power unit 10 may not be completely charged. In this case, the insufficient power supply to the backup auxiliary power unit may fail data backup operation.

(5) When data in the shared memory unit 2a is restored at a system re-startup operation, provided that the entire restoring path shown in FIG. 5 is not in an operable state after the startup operation, the data restoring operation cannot be performed by transferring backup data from the storage medium 6 to the shared memory unit 2a. Hence it is necessary to begin the restoring operation after waiting that the entire restoring path starts up and then is in an operable state. This leads to consuming the time during which data has been completely restored after recovering from a power failure.

(6) Where the system cannot be used because of a trouble on a part of the backup path or restoring path shown in FIG. 5, the backup operation or restoring operation described before cannot be performed.

(7) Since the backup data storing area (backup area) must be ensured on the storage medium 6, ensuring the area takes much time. Where the capacity of the shared memory unit 2a in the shared storage device 2 is increased due to enhancement and so forth it is needed to re-ensure the region where the increment data is backed up.

(8) Where the backup area is ensured on the storage medium 6 by previously considering an increase in the memory capacity at the enhancement described above, the backup area for the increased memory capacity becomes extra until the capacity of the shared memory unit 2a is actually increased. This means that the storage medium 6 is used wastefully.

SUMMARY OF THE INVENTION

The present invention is made to overcome the above mentioned problems. An object of the present invention is to provide a storage device with a backup function that can reduce the backup operation time by shortening the backup path and that can decrease the capacity of the backup auxiliary power unit.

In order to achieve the above objects, according to the present invention, the storage device with a backup function having a memory unit and a memory control unit that controls access to the memory unit is characterized by a backup storage medium and a backup control unit. The backup control unit implements an access control under which data in the memory unit is read out via the memory control unit when data in the memory unit is backed up and the readout data is written as backup data into the backup storage medium.

The backup control unit implements an access control to restore data stored in the memory unit by reading out backup data stored in the backup storage medium and writing the readout backup data as restored data into the memory unit via the memory control unit.

The backup control unit receives power energy from an external auxiliary unit at a power failure and implements an access control at a data backup operation.

The information processing system having a storage device with a backup function, the information processing system including at least one processing unit, a storage device connected to the processing unit via a bus for receiving a write request or a read request from the processing unit, a power unit for supplying power energy to the processing unit and the storage device, and an auxiliary power unit for supplying power energy to the storage device at a failure of the power unit, the storage device is characterized by a memory unit; a bus control unit connected to the bus for controlling transmission and reception via the bus; a memory control unit for controlling access to the memory unit based on the write request or the read request received via the bus and the bus control unit; a backup storage medium; and a backup control unit for implementing an access control under which data stored in the memory unit is read out via the memory control unit when data in the memory unit is backed up and the readout data is written as backup data into the backup storage medium.

The backup control unit implements an access control to restore data stored in the memory unit by reading out backup data stored in the backup storage medium and writing the readout backup data as restored data into the memory unit via the memory control unit.

As described above, according to the present invention, the storage device with a backup function as well as the information processing system including the same have the effects as follows:

(1) The backup path closed in the storage device being a significantly shortened path (data transfer path) can reduce the backup operation time. The auxiliary power unit can be greatly decreased in its capacity in virtue of the reduced backup operation time and the auxiliary power source supplying only to the storage unit at the backup operation.

(2) The auxiliary power unit with reduced capacity can realize small-sizing the auxiliary power unit and the information processing system.

(3) The auxiliary power unit with reduced capacity can reduce its charging time and can surely back up data even in a possible power failure repeated at short intervals.

(4) The backup path closed in the storage device can certainly perform the backup operation regardless of a failure occurring on a bus outside the storage device.

(5) Like the backup path, since the restoring path (data transfer path) is closed within the storage device and significantly shortened, the data restoring operation can be performed merely by starting up the storage device to an operable state. Hence the time for the data restoring operation can be greatly reduced.

(6) The backup path closed in the storage device can certainly perform the data restoring operation regardless of a failure occurring on a bus outside the storage unit or of being in initialization.

(7) Since the area of an external storage medium which is ensured for a backup operation can be opened for users, the capacity of the storage medium outside the storage device can be effectively used.

(8) Even if the memory capacity of the storage device is enlarged, the trouble of ensuring the area necessary for backup operation with the enlargement can be omitted.

DESCRIPTION OF THE PREFERRED EMBODIMENTS

Let us explain an embodiment of the present invention with reference to the attached drawings.

Figure 1:
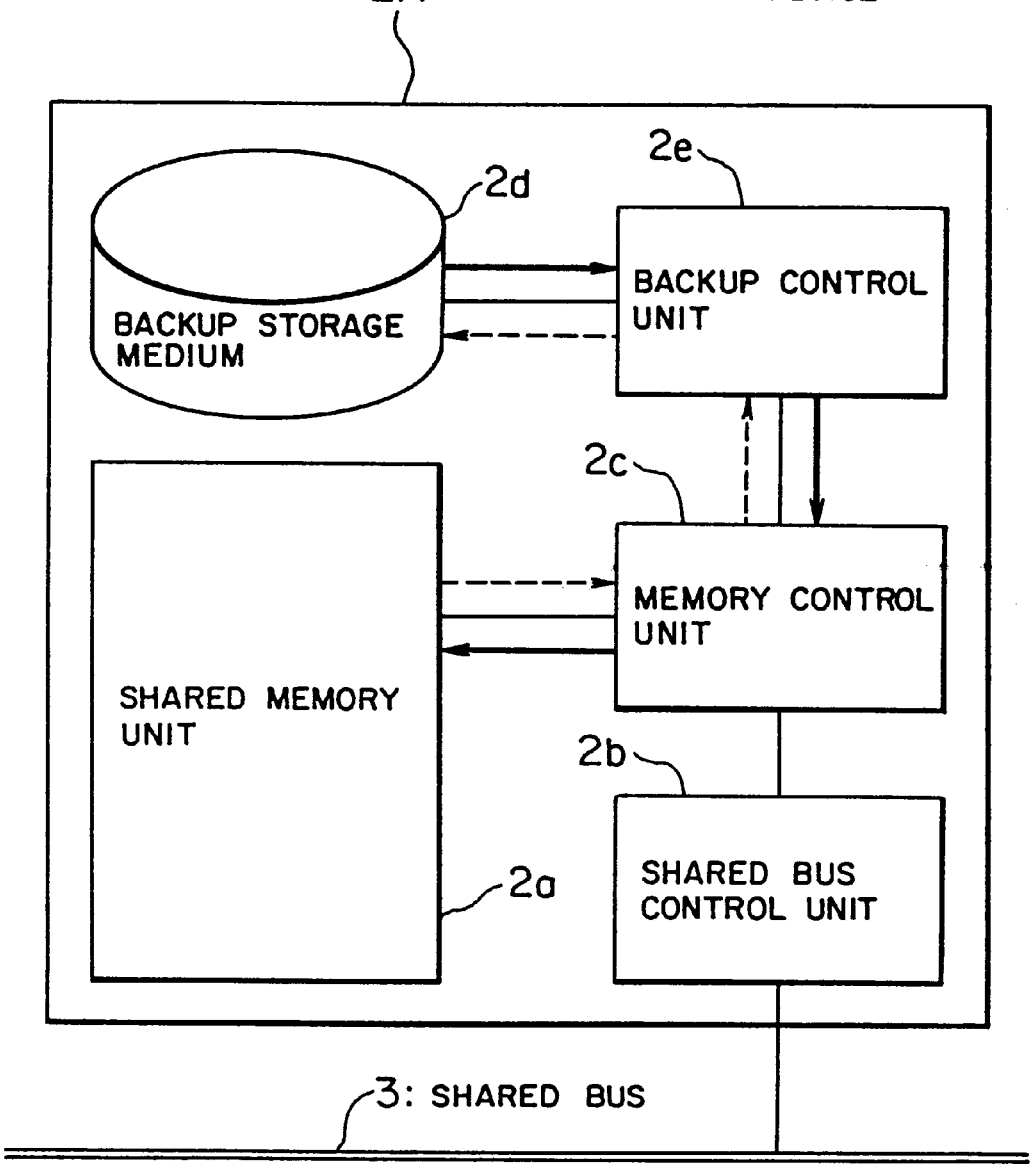
FIG. 1 is a block diagram showing the configuration of a storage device with a backup function according to an embodiment of the present invention and the data backup operation and data restoring operation in this embodiment.
Figure 2:
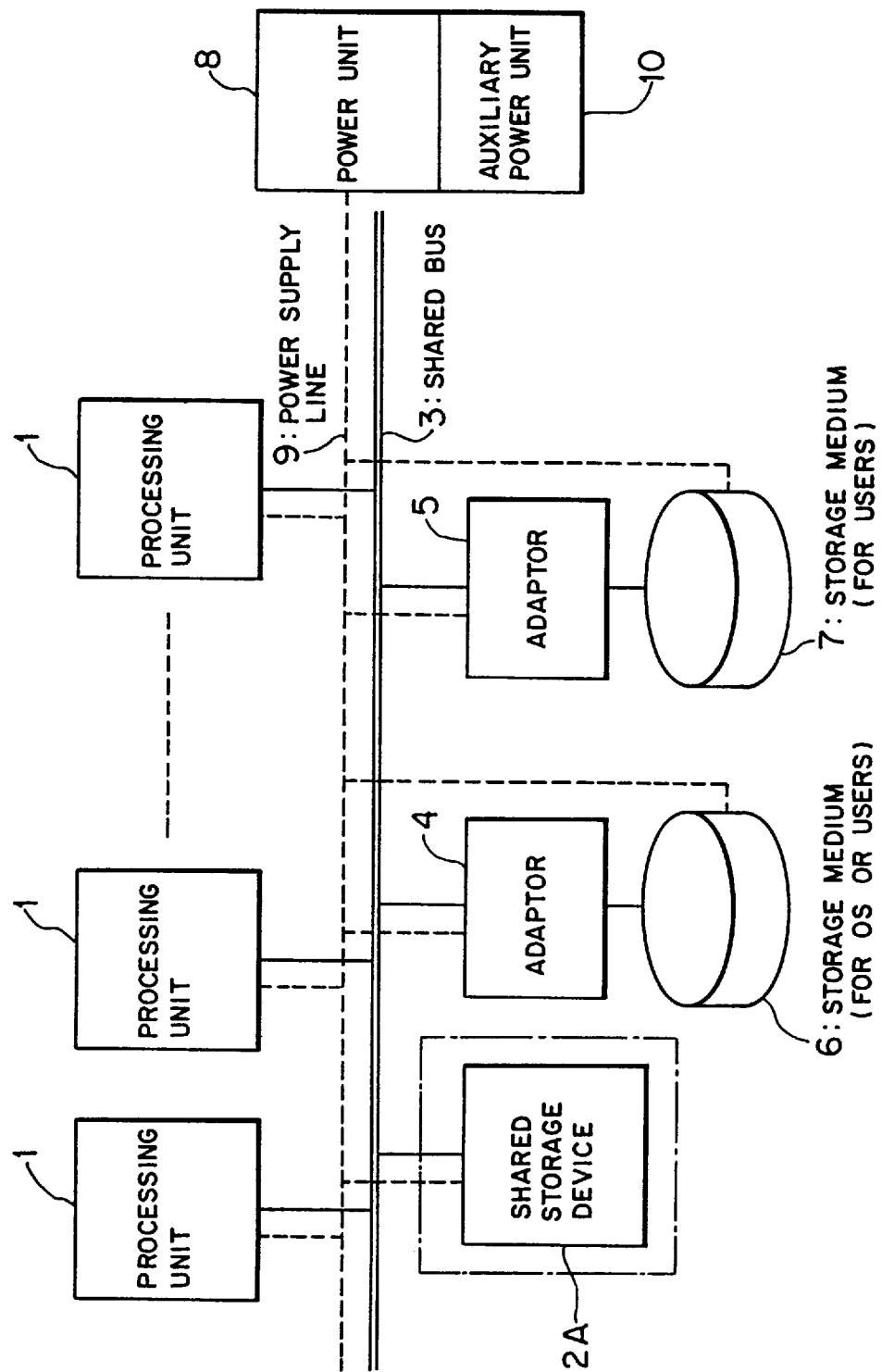
FIG. 2 is a block diagram showing the configuration of an information processing system including a storage device with a backup function according to an embodiment of the present invention.
Figure 3:
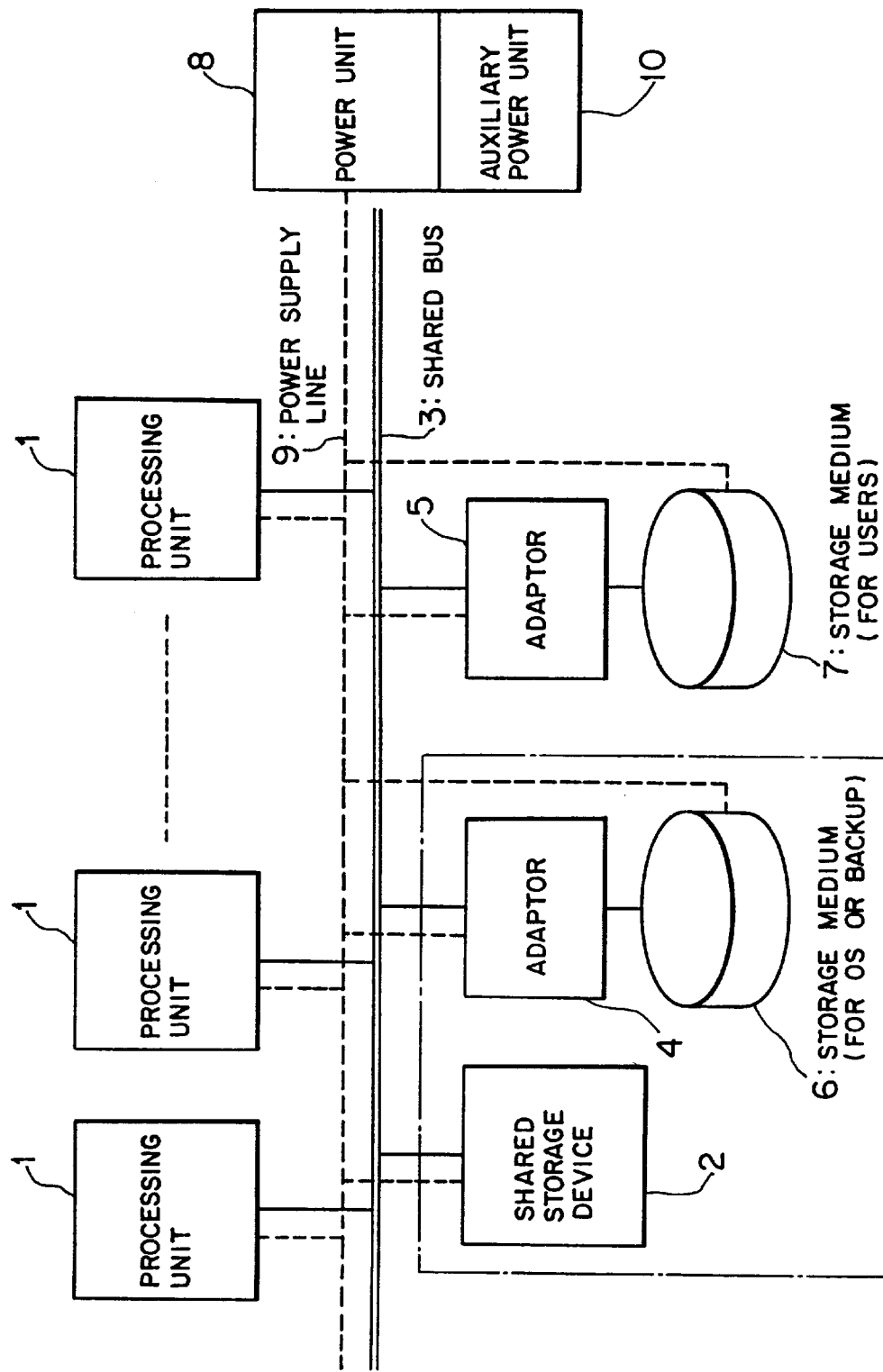
FIG. 3 is a block diagram showing the configuration of a general information processing system.

First, the parallel computing system (information processing system) being an embodiment of the present invention will be explained below by referring to FIG. 2. In a manner similar to that shown in FIG. 3, the system according to the present embodiment, as shown in FIG. 2, includes plural processing units (processor elements) 1 and a sole shared storage device 2A shared by the processing units 1. The processing units 1 are connected to the shared storage device 2A via the shared bus 3. The shared storage device 2A formed as shown in FIG. 1 receives a write request or a read request from each processing unit 1 via the shared bus 3.

A storage medium 6 such as a magnetic tape unit or magnetic disk unit is connected to the shared bus 3 via the adaptor 4. A storage medium 7 such as a magnetic tape unit or magnetic disk unit is connected to the shared bus 3 via the adaptor 5. Each processing unit 1 can access the storage medium 6 via the shared bus 3 and the adaptor 4 or the storage medium 7 via the shared bus 3 and the adaptor 5. The shared storage device 2 can access the storage medium 6 via the shared bus 3 and the adaptor 4 or the storage medium 7 via the shared bus 3 and the adaptor 5. The adaptor 4 controls access to the storage medium 6 based on a write request or read request received via the shared bus 3. The adaptor 5 controls access to the storage medium 7 based on a write request or read request received via the shared bus 3. These adaptors are formed in a similar manner to that shown in FIG. 5.

Data storage area for OS or application software is allocated to the storage medium 6 according to the present embodiment. Generally, data storage area allocated for data backup of the shared storage device 2 is allocated for a user. Data storage area for a user is allocated to the storage medium 7, in a manner similar to a general storage medium.

A power unit 8 is connected to each processing unit 1, the shared storage device 2A, adaptors 4 and 5, and storage media 6 and 7 via the power supply line 9 to supply power energy via the power supply line 9. An auxiliary power unit (backup power source) 10 is additionally arranged to the power unit 8. This auxiliary power unit 10 supplies backup auxiliary power energy to the shared storage device 2A via the power supply line 9. Referring to FIG. 2, the area (that is, shared storage device 2A) surrounded with alternate long and short line corresponds to the area where the auxiliary power unit 10 should supply backup auxiliary power energy.

The shared storage device 2A used in the system according to the present embodiment shown in FIG. 2 is formed as shown in FIG. 1. FIG. 1 is a block diagram showing the configuration of the shared storage device (or storage device with backup function) 2A according to an embodiment of the present invention and the data backup operation and data restoring operation in the present embodiment.

Figure 4:
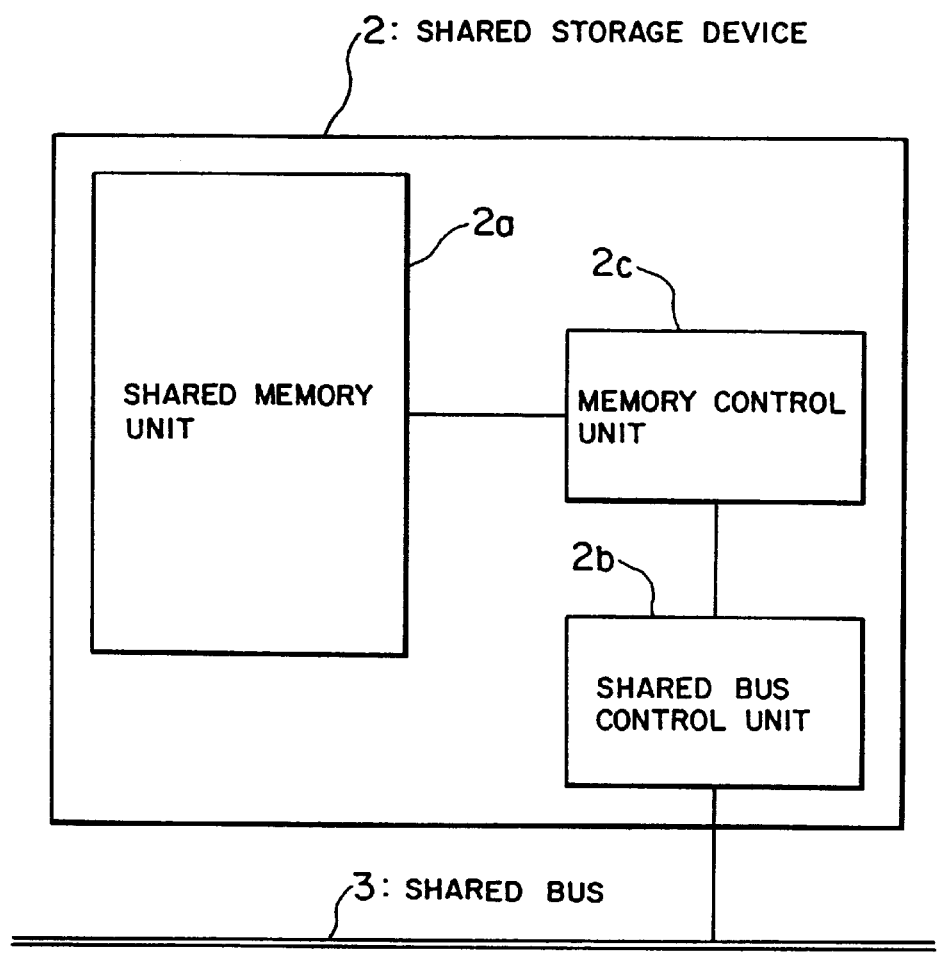
FIG. 4 is a block diagram showing the configuration of a general storage device.

Likewise that shown in FIG. 4, the shared storage device 2A in the present embodiment shown in FIG. 1 includes a backup storage medium 2d and the backup control unit 2e, in addition to a shared memory unit 2a, a shared bus control unit 2b connected to the shared bus 3 for controlling transmission and reception via the shared bus 3, and a memory control unit 2c based on the write request or the read request to each processing unit 1 received via the shared bus 3 and the shared bus control unit 2b.

The shared storage unit 2A includes, for example, a magnetic disk unit as the backup storage medium 2d.

The backup control unit 2e has the function (backup control function) of performing access control under which data stored in the shared memory unit 2a is read out via the memory control unit 2c when data stored in the shared memory unit 2a is backed up and the readout data is written as backup data to the backup storage medium 2d.

Moreover, the backup control unit 2e according to the present embodiment has the function (restoring (data restoring) control function) of performing access control under which backup data stored in the backup storage unit 2d is read out when data stored in the shared memory unit 2a is restored and the readout backup data is written as restored data to the shared memory unit 2a via the memory control unit 2c.

The data backup operation and data restoring operation of the computing system having the shared storage device 2A will be explained below by referring to FIG. 1.

In the system according to the present embodiment, the shared storage device 2A receives backup auxiliary power energy from the auxiliary power unit 10 at a power failure and implements a data backup operation as shown with the dotted arrows (corresponding to a backup path) in FIG. 1.

The memory control unit 2c reads out data stored in the shared memory unit 2a and sends it to the backup control unit 2e. The backup control unit 2e writes the data into the backup storage medium 2d. This allows data stored in the shared storage device 2A to be backed up. In this case, the auxiliary power unit 10 supplies backup auxiliary power energy to the shared storage device 2A, particularly to units except the shared bus control unit 2b including the shared memory unit 2a, the memory control unit 2c, the backup storage medium 2d, and the backup control unit 2e.

On the other hand, when the system starts up after recovering from a power failure and the shared storage device 2A becomes in an operable state, with the receive power energy supplied from the power unit 8, the backup control unit 2e reads data from the backup storage medium 2d and sends to the memory control unit 2c, as shown with the thick solid arrows (corresponding to a restoring path) in FIG. 1. The memory control unit 2c writes the data into the shared memory unit 2a. This allows data to the shared storage device 2A to be restored.

Figure 5:
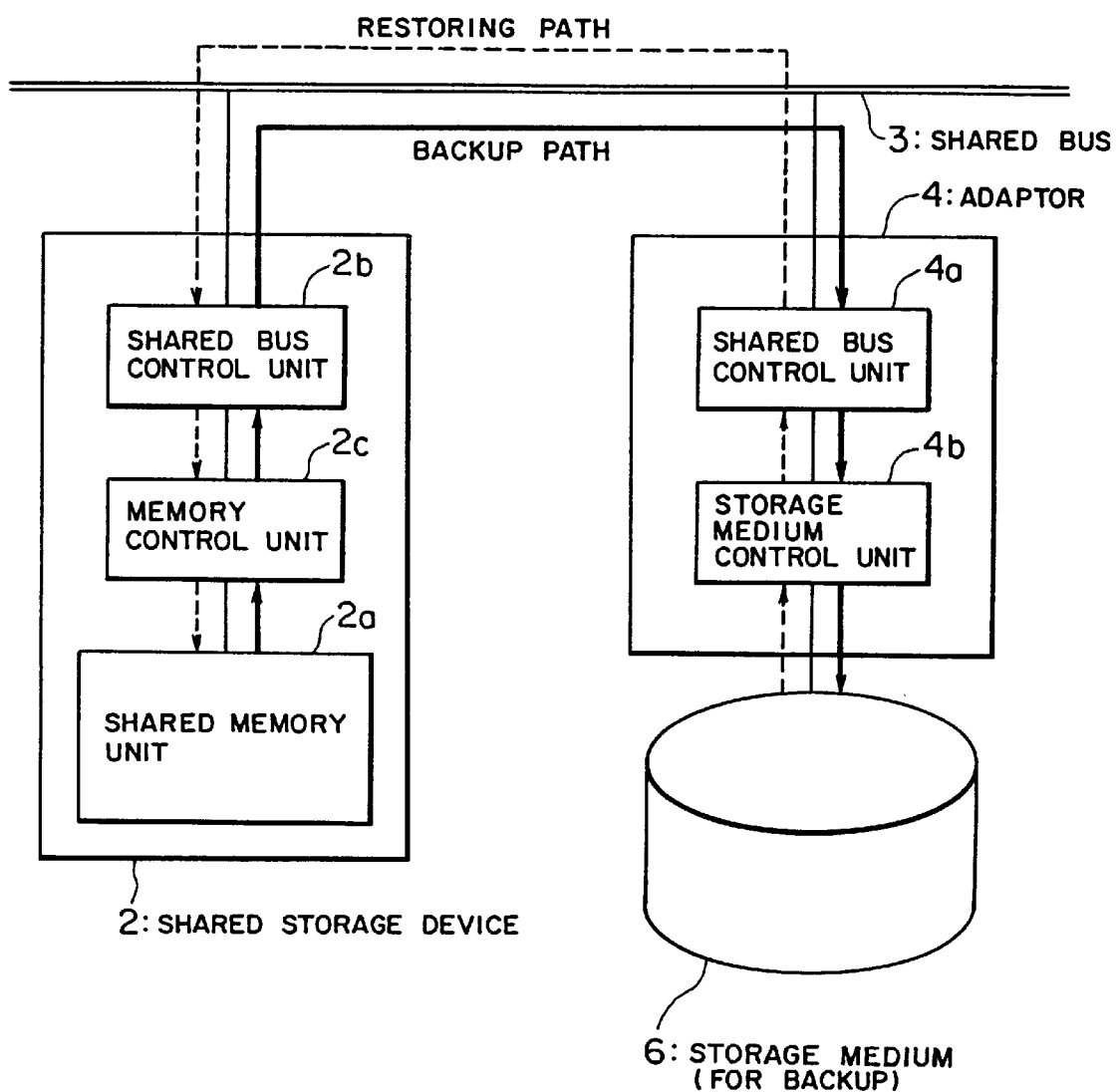
FIG. 5 is a block diagram showing the data backup operation and data restoring operation in a general information system.

As described above, each of the shared storage device 2A and the computing system in the present embodiment includes the backup storage medium 2d mounted on the shared storage device 2A and the backup control unit 2e that controls access to the storage medium 2d. This feature provides the following functions and effects:

(1) No backup path shown in FIG. 5 including the shared bus 3 and the adaptor 4 is needed at a backup operation. Hence the backup path can be significantly shortened because the data transfer path shown in FIG. 1 is closed in the shared storage device 2A at a backup operation and the backup control unit 2e in the shared storage device 2A implements a direct writing operation to the backup storage medium 2d. The time for backup operation can be reduced.

(2) In the related art, malfunction which occurs due to a trouble at a part of the backup path shown in FIG. 5 makes it impossible to perform the backup operation. However, according to the present invention, since the backup storage medium 2d is mounted in the shared storage device 2A shown in FIG. 1, it is possible to perform the backup operation regardless of the presence of trouble in the shared bus 3.

(3) The data transfer path at a backup operation is closed in the shared storage device 2A to perform the backup operation only in the shared storage device 2A. Hence the auxiliary power unit 10 supplies backup power energy only to the area surrounded with alternate long and short line shown in FIG. 1, that is, the shared storage device 2A. The backup power supply range is greatly narrower than the general one shown in FIG. 3, thus significantly reducing the capacity of the auxiliary power unit 10.

(4) The auxiliary power unit 10 can be slimmed thanks to its reduced capacity. This leads to the small-sized computing system. Since the small capacity of the auxiliary power unit 10 allows its short charging time, the auxiliary power energy for backup operation can be certainly supplied even if power failure should occur repeatedly at short intervals. As a result, data backup operation can be performed certainly.

(5) At the system restarting time after recovering from a power failure, etc., data cannot be generally restored unless all restoring paths shown in FIG. 5 start up and then become operable. However, according to the present embodiment, the backup control unit 2e in the shared storage device 2A reads data out of the backup storage medium 2d to transfer it to the memory control unit 2c. Then the memory control unit 2c writes the data into the shared memory unit 2a. Hence the shortened data transfer path enables the data restoring operation merely by starting up the shared storage device 2A to its operable state. As a result, the time necessary for data restoring operation can be significantly reduced.

(6) Where the shared bus 3 or adaptor 4 on the restoring path shown in FIG. 5 is troubled or malfunctioned in its initializing process, the general system cannot deal with the data restoring operation. However, according to the present embodiment, since the backup storage medium 2d is mounted on the shared storage device 2A as shown in FIG. 1, the data restoring operation can be certainly made regardless of the presence of trouble in the shared bus 3 or being in initialization.

(7) The backup storage medium 2d mounted in the shared storage device 2A allows the data store area of the backup storage medium 6 used to be emptied. The storage medium 6 can be effectively used by ensuring area opened for a user.

(8) Even when enhancement causes an enlargement of the memory capacity of the shared storage device 2A, it is not needed to re-ensure the backup area in the storage medium 6 so that the operator's trouble can be omitted.

In the embodiment described above, the present invention has been applied to the shared storage device 2A shared by plural storage devices 2A in a parallel computing system. However, the present invention should not be limited only to the embodiment. The storage device according to the present invention is applicable to a storage unit accessed by a sole processing unit. Thus the function and effect similar to those in the embodiment described above can be obtained.

What is claimed is:

1. A storage device having a backup function and adapted to be connected to at least one processing unit via a shareable bus, said storage device comprising:
    a memory unit accessed by said at least one processing unit via said shareable bus;
    a memory control unit, operatively coupled to said memory unit, for controlling accessing to said memory unit;
    a backup storage medium for storing data of said memory unit as backup data; and
    a backup control unit for controlling accessing to said backup storage medium;
    said backup storage medium, together with said memory unit, said memory control unit and said backup control unit being mounted in said storage device and coupled to said memory unit via said backup control unit and said memory control unit within said storage device without utilizing said shareable bus such that data in said memory unit is read via said memory control unit and the read data is then written into said backup storage medium via said backup control unit as the backup data without being transmitted on said shareable bus.

2. The shared storage device with a backup function according to claim 1, wherein said backup control unit implements an access control to restore data stored in said memory unit by reading out backup data stored in said backup storage medium and writing the readout backup data as restored data into said memory unit via said memory control unit.

3. The shared storage device with a backup function according to claim 1, wherein said backup control unit receives power energy from an external auxiliary unit at a power failure and implements an access control at a data backup operation.

4. The shared storage device with a backup function according to claim 2, wherein said backup control unit receives power energy from an external auxiliary unit at a power failure and implements an access control at a data backup operation.

5. An information processing system, comprising:
    at least one processing unit connected via a shareable bus;
    a storage device having a backup function and connected to said at least one processing unit via said shareable bus for receiving a write/read request from said at least one processing unit;
    a power unit for supplying power to said processing unit and said storage device; and
    an auxiliary power unit for supplying power to said storage device at a failure of said power unit,
    said storage device including:
        a memory unit,
        a shareable bus control unit connected to said shareable bus for controlling transmission and reception of data from said storage device to said processing unit and vice versa via said shareable bus,
        a memory control unit for controlling accessing to said memory unit based on the write/read request received via said shareable bus and said shareable bus control unit,
        a backup storage medium for storing data of said memory unit as backup data, and
        a backup control unit for controlling accessing to said backup storage medium,
        said backup storage medium, together with said memory unit, said memory control unit and said backup control unit being mounted in said storage device and being coupled to said memory unit via said backup control unit and said memory control section within said storage device without utilizing said shared bus such that data in said memory unit is read via said memory control unit and the read data is then written into said backup storage medium via said backup control unit as the backup data without being transmitted on said shareable bus.

6. The information processing system having a storage unit with a backup function according to claim 5, wherein said backup control unit implements an access control to restore data stored in said memory unit by reading out backup data stored in said backup storage medium and writing the readout backup data as restored data into said memory unit via said memory control unit.

* * * * *